US008161254B2

(12) United States Patent
Liu

(10) Patent No.: US 8,161,254 B2
(45) Date of Patent: Apr. 17, 2012

(54) METHOD FOR CREATING CONSISTENT BACKUP IMAGE OF A STORAGE VOLUME WITHOUT REQUIRING A SNAPSHOT

(75) Inventor: Peter Chi-Hsiung Liu, Paramus, NJ (US)

(73) Assignee: Syncsort Incorporated, Woodcliff Lake, NJ (US)

( * ) Notice: Subject to any disclaimer, the term of this patent is extended or adjusted under 35 U.S.C. 154(b) by 600 days.

(21) Appl. No.: 12/349,069

(22) Filed: Jan. 6, 2009

(65) Prior Publication Data

US 2009/0300305 A1    Dec. 3, 2009

Related U.S. Application Data

(60) Provisional application No. 61/058,071, filed on Jun. 2, 2008.

(51) Int. Cl.
*G06F 13/00* (2006.01)

(52) U.S. Cl. ............................... 711/162; 711/E12.103

(58) Field of Classification Search ........................ None
See application file for complete search history.

(56) References Cited

U.S. PATENT DOCUMENTS

| 5,212,784 | A |   | 5/1993  | Sparks |
|-----------|---|---|---------|--------|
| 5,487,160 | A |   | 1/1996  | Bemis |
| 6,549,921 | B1 |  | 4/2003  | Ofek |
| 7,099,903 | B2 |  | 8/2006  | Kawamura |
| 2007/0266203 | A1 | | 11/2007 | Amano et al. |
| 2009/0271581 | A1 | * | 10/2009 | Hinrichs, Jr. ................. 711/162 |

FOREIGN PATENT DOCUMENTS

WO    WO00/77641 A1    12/2000

OTHER PUBLICATIONS

IBM Corporation, IBM Tivoli Storage Manager, 2002 (U.S.), retrieved from www.saturnb2b.com/downloads/pdf/TSM.pdf.
Symantec Corporation, Managing Storage Complexity for Healthcare Providers, Nov. 2007 (U.S.), retrieved from eval.symantec.com/mktginfo/enterprise/white_papers/ent-whitepaper_managing_storage_complexity_11-2007.en-us.pdf.
Garimella, N., Understanding and exploiting snapshot technology for data protection, Part 1: Snapshot technology overview, Apr. 26, 2006 (U.S.), retrieved from www-128.ibm.com/developerworks/tivoli/library/t-snaptsm1/.
Garimella, N., Understanding and exploiting snapshot technology for data protection, Part 2: Protecting data using snapshot and IBM Tivoli Storage Manager, Apr. 26, 2006 (U.S.), retrieved from www-128.ibm.com/developerworks/tivoli/library/t-snaptsm2/.
Anon. (Wikipedia), Snapshot (computer storage), Dec. 2008, retrieved from en.wikipedia.org.wiki/Snapshot (computer_storage).

* cited by examiner

*Primary Examiner* — Edward Dudek, Jr.
*Assistant Examiner* — Sean D Rossiter
(74) *Attorney, Agent, or Firm* — Ronald Abramson; Hughes Hubbard & Reed LLP

(57) ABSTRACT

Method for creating a consistent image, on a destination volume, of a target volume that remains in production use while the image is being created, without requiring the use of a snapshot, by copying the data on the target volume to the destination volume, maintaining changes to data blocks that arise on the target volume during copy operations, copying changed blocks to the destination volume, and repeating changed block updates as necessary until there are no further changed blocks on the target volume (all as more fully described in the specification).

6 Claims, 4 Drawing Sheets

METHOD FOR CREATING CONSISTENT BACKUP IMAGE OF A STORAGE VOLUME WITHOUT REQUIRING A SNAPSHOT

CROSS-REFERENCE TO RELATED APPLICATIONS

This application claims the benefit of U.S. Provisional Application No. 61/058,071, filed Jun. 2, 2008, the entire disclosure of which is hereby incorporated by reference.

BACKGROUND OF THE INVENTION

1. Field of the Invention

The invention is in the field of data protection, and more particularly concerns methods for creating a consistent backup image of a storage volume as it existed at a point in time, where the storage volume remains available for read and write operations during the period that such image is being created, without the necessity of using "snapshot" methods.

2. Description of the Related Art

Backup, redundancy and disaster recovery (the latter two of which presume the ability to back up data volumes) are major concerns in the area of data protection. A full backup of a large data set may take a long time to complete. On multi-tasking or multi-user systems, there may be writes to that data while it is being backed up. This prevents the backup from being self-consistent (atomic) and introduces a skew in the backed-up data that may result in data corruption. For example, if a user moves a file from a directory that has not yet been backed up into a directory that has already been backed up, then that file would be completely missing on the backup media. Version skew may also cause corruption with files that change their size or contents underfoot while being read. See en.wikipedia.org/wiki/Snapshot_(computer_storage).

One approach to safely backing up live data is to temporarily disable write access to data during the backup, either by stopping the accessing applications or by using a locking API provided by the operating system to enforce exclusive read access. This is tolerable for low-availability systems (on desktop computers and small workgroup servers, on which regular, extended downtime is acceptable). High-availability 24/7 systems, however, cannot bear service stoppages of this nature.

To avoid downtime, high-availability systems may instead perform the backup on a "snapshot"—a read-only copy of the data set frozen at a point in time—and allow applications to continue writing their data in a manner that does not interfere with the integrity of the particular data set comprising the snapshot.

There are numerous snapshotting implementations. In some approaches, the method involves (a) flushing all buffers; (b) blocking all writes; (c) recording all file metadata; and (c) suspending or redirecting writes in some manner (such as caching, directing the written data to alternate locations, and numerous other variations). The data blocks at the point in time of the snapshot are identified by the metadata that was collected. The underlying blocks of the snap-shot may then be copied for as long as necessary while changed data (after the point-in-time of the snapshot) is stored elsewhere—i.e., in other blocks or completely other places than where the data corresponding to the snapshot is located.

Actual snapshot implementations range from "copy on write" techniques using volume managers (in which a snap-shot is taken of device control blocks and the original blocks treated as read-only with new and changed blocks thereafter written in different locations), to approaches based on version-tracking internal to the file system, to database approaches, memory-based approaches and other approaches. Most snapshot implementations are relatively efficient and can create snapshots in O(1). In other words, the time and I/O needed to create the snapshot does not significantly increase with the size of the data set, whereas the same for a direct backup is proportional to the size of the data set. It is still necessary to back up the underlying data set, but this can be done while the volume is in full use, and the resources used to copy the data can be balanced so as not to interfere unduly with normal production processing.

Nevertheless, taking snapshots of large volumes, while not as time consuming as performing a full-volume backup, still takes a non-negligible amount of time, during which pending writes must be delayed, interrupted, suspended or otherwise interfered with. If the volume is being used very heavily in production, completing a snap-shot may take on the order of tens of minutes, or more, due to the heavy and continuous storage device I/O under such conditions. Over such an extended period, the assumptions on which the particular snap-shotting approach is based my not bear out. Accordingly, in practice, an unacceptably high number of large volume snapshots will fail under such high load conditions. This may delay or make it impossible to create a good backup within the requisite time frame, which consequently creates practical problems for enterprise data protection programs.

SUMMARY OF THE INVENTION

It is an object of the present invention to provide a method of creating an image of a target volume that represents the data in the volume in a self-consistent manner at a particular point in time, without the vulnerability to high production processing loads that results from the necessity of having to take a snapshot.

In one embodiment, the invention provides a method for creating a consistent image, on a destination volume, of a target volume that remains in production use while the image is being created, without requiring the use of a snapshot. In that implementation, the processing steps include the following: (a) copying all of the data in the target volume to the destination volume (without regard to changes in the data while it was being copied), (b) maintaining a record identifying those data blocks on the target volume that have changed since the beginning of the preceding set of copy operations; (c) copying to the destination volume those data blocks identified by said record as having changed on the target device since the beginning of the preceding set of copy operations, in such manner as to replace any prior representation of those blocks on the destination device; and (d) repeating steps (b) and (c), to synchronize changes, until said record shows no changed blocks on the target volume. Additionally, in certain preferred embodiments, where repeated synchronization steps are necessary, writing to storage may be temporarily slowed to accelerate the conclusion of processing.

Other aspects and advantages of the invention will be apparent from the accompanying drawings, and the detailed description that follows.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF PREFERRED EMBODIMENTS

The following is a detailed description of certain embodiments of the invention chosen to provide illustrative examples of how it may preferably be implemented. The scope of the invention is not limited to the specific embodiments described in the following detailed description, nor is it limited by any specific implementation, embodiment or characterization depicted in the accompanying drawings or stated or described in the invention summary or the abstract. In addition, it should be noted that this disclosure describes a number of processing methods each comprising a plurality of steps. Nothing contained in this written description should be understood to imply any necessary order of steps in such methods, other than as specified by express claim language.

Figure 1:
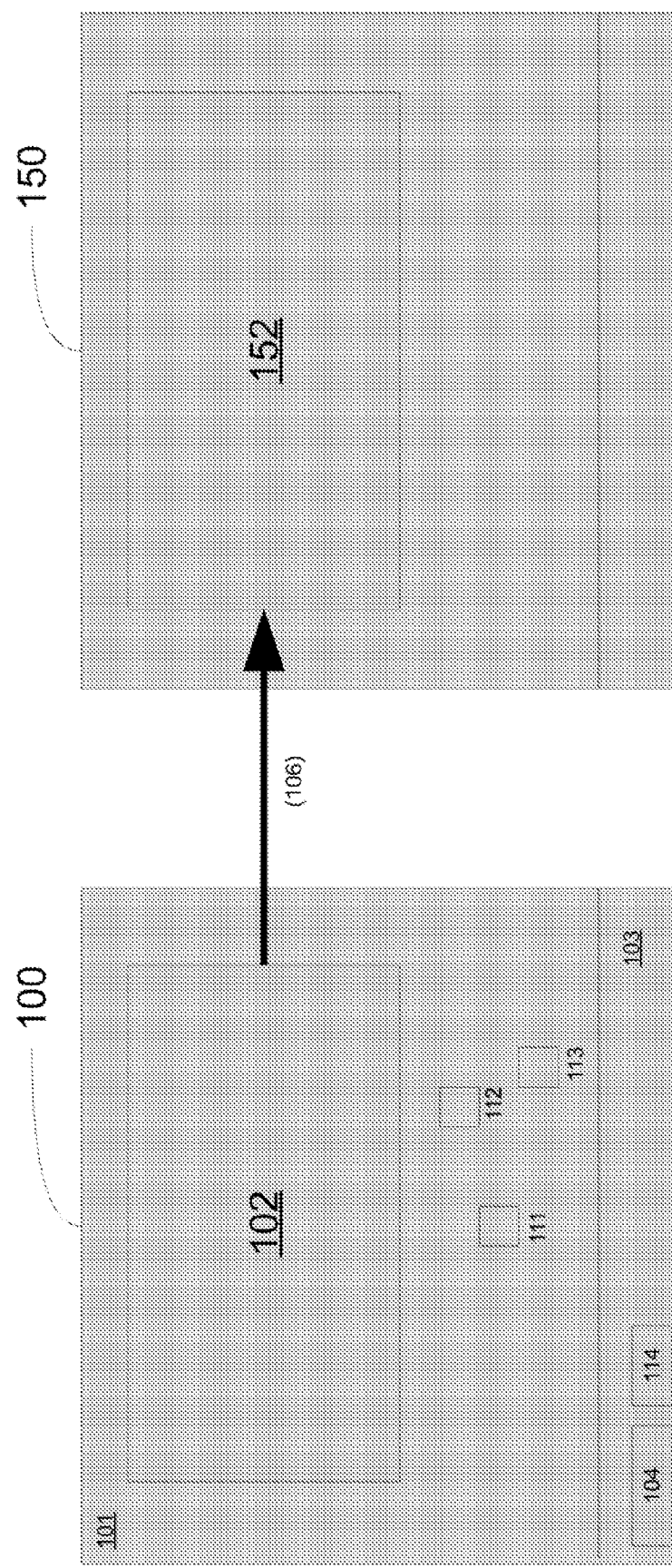
FIG. 1 is a block diagram illustrating a prior art method of making an image of a storage volume with the use of a snapshot.

FIG. 1 is a block diagram illustrating a prior art method of making an image of a storage volume, here target volume 100 with the use of a snapshot 102. Target volume 100, and the other storage volumes mentioned in this disclosure, may each be single accessible storage areas with a single file system, typically resident on a single partition of a hard disk. However, they may alternately be storage areas on other devices, or aggregated areas treated as a single logical space for some purposes, such as by a logical volume manager or like system.

In a prior art system, when it is desired to make a consistent image of target volume 100, for example, a backup image, where the target volume 100 must remain in production use during the imaging operation, the system (not shown) controlling the target volume will create a point-in-time snapshot 102. Snapshot 102, shown in FIG. 1 for simplicity as a contiguous area, but not necessarily so, contains all of the data blocks on target volume 100 as of a specified point in time. The way it is determined is by (a) flushing all buffers; (b) blocking all writes; and (c) recording all file metadata in a control block area 104, with the result that the recorded metadata in control block area 104 points to the data blocks comprising snapshot 102. The system controlling target volume 100 then ensures that the data in snapshot 102 is not changed, by causing all changed and new data to be written elsewhere, for example in areas 111, 112, and 113 (which may be single blocks or groups of blocks). After snapshot 102 has been established, it will remain undisturbed and may be copied at any pace desired (operation 106, shown as an arrow in FIG. 1) to area 152 on destination volume 150. New data blocks 111, 112, 113 (etc.) are written outside the storage area reserved for the snap-shot, but they are not part of the current imaging process.

It should be apparent that the prior art approach reflected in FIG. 1 assumes the ability to quiesce the file system for long enough to capture consistent metadata for the entire volume in control area 104. As explained above, this is not always feasible in high-volume production situations, causing backups to be delayed or to fail. There have been numerous developments to attempt to reduce the processing requirements for making snapshots, but all of the current approaches inevitably result in a conflict with production requirements, given high enough volumes and loads.

Figure 2:
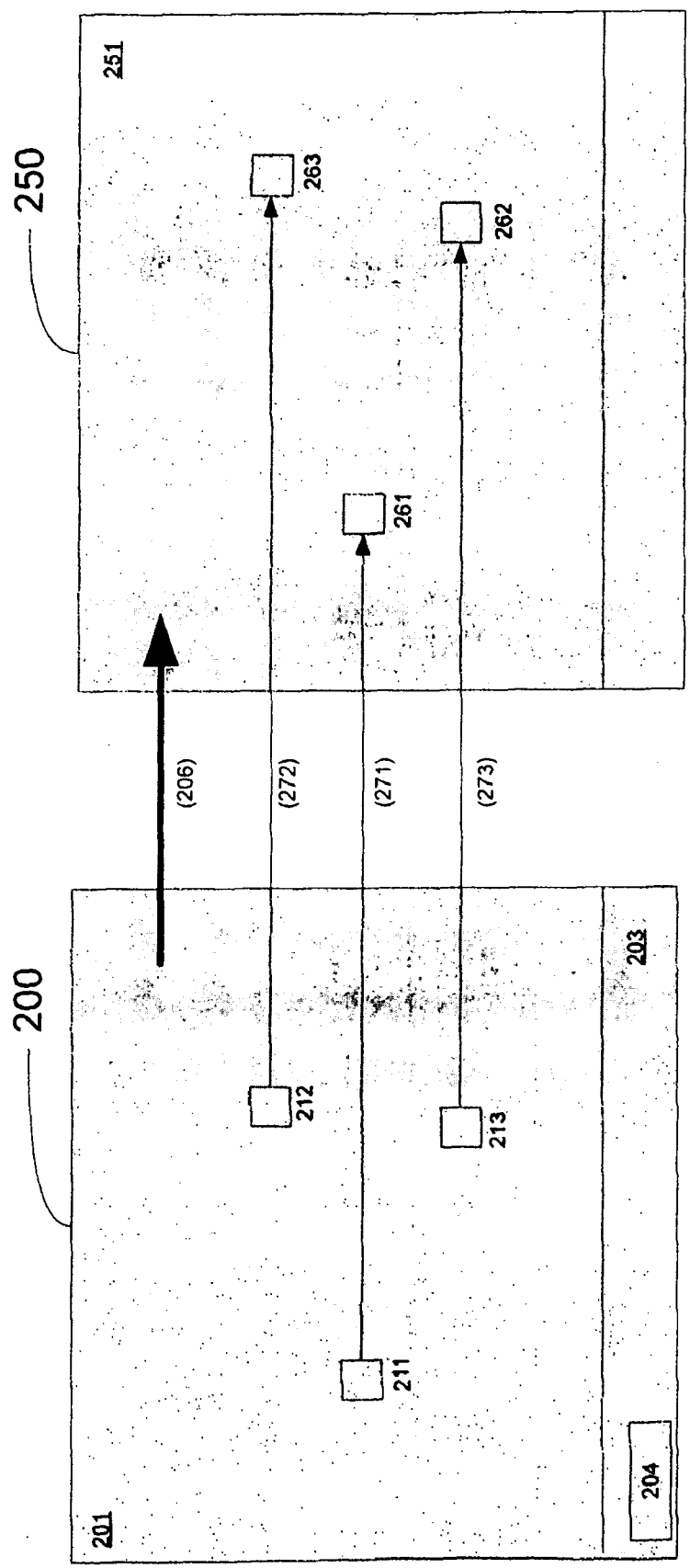
FIG. 2 is a block diagram illustrating a method in accordance with one embodiment of the invention for making a consistent image of a storage volume without the use of a snapshot.
Figure 3:
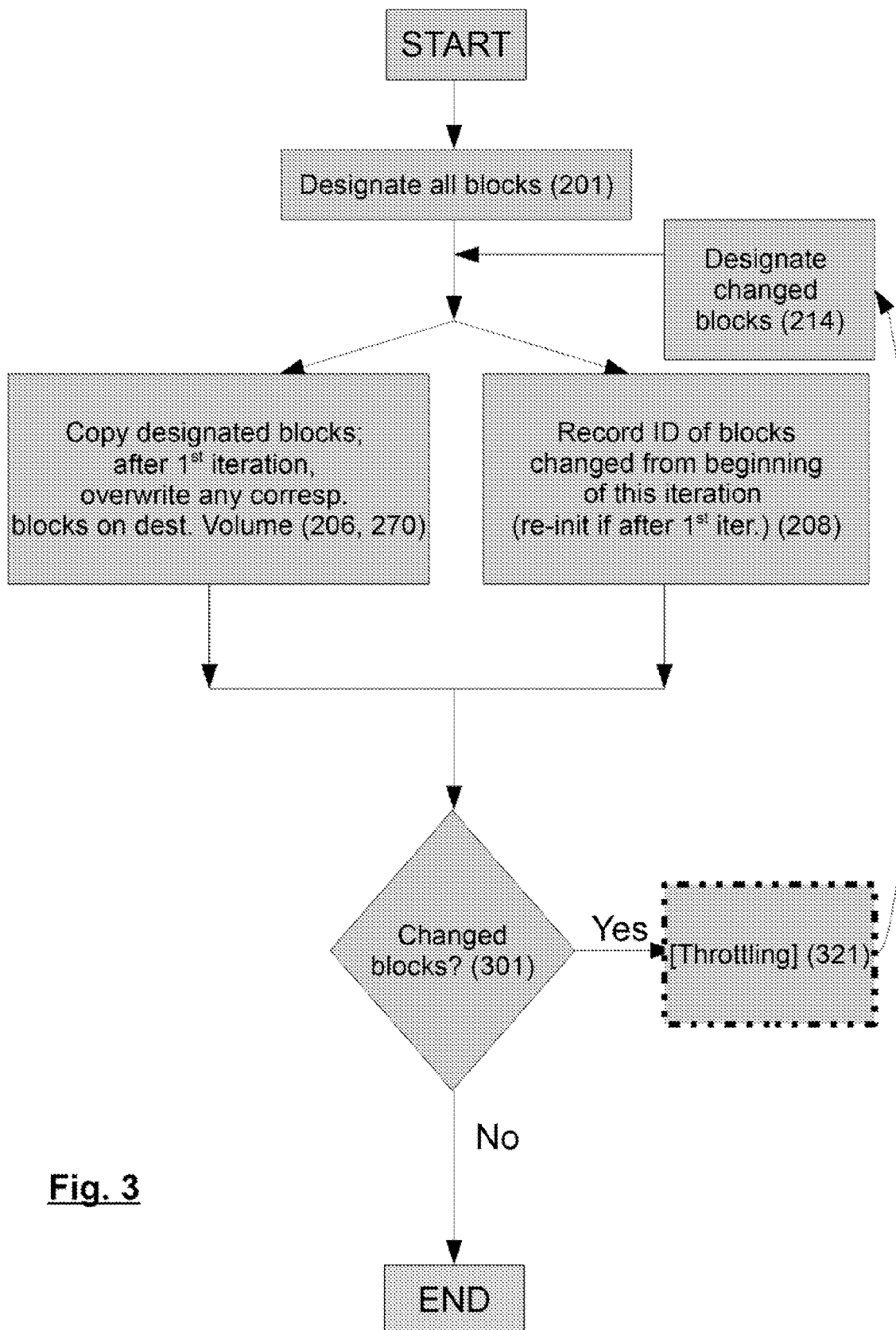
FIG. 3 is a flow chart showing an exemplary sequence of steps for carrying out the process reflected in FIG. 2.

FIG. 2 is a block diagram illustrating a method in accordance with one embodiment of the invention for making a consistent image of storage volume, in this case, target volume 200, without the use of a snapshot, while target volume 200 remains in full production use. FIG. 3 is a flow chart showing an exemplary sequence of steps to carrying out the process reflected in FIG. 2, and can be consulted in conjunction with FIG. 2.

In the illustrative method, the system (not shown) controlling target volume 200 and destination volume 250 causes all of the data on target volume 200 occupying its data storage area 201 to be copied (via the operation denoted by arrow 206 and identified in FIG. 3 as the "bulk copying process") to the data storage area 251 of destination volume 250. This step is done without regard to data changes that occur during such copying as a result of target volume 200 simultaneously being used in full volume production. Operationally, this step resembles the step in FIG. 1 of copying the snapshot image (and involves similar overhead which can be scheduled, load balanced, etc.), except that there is no snapshot image, and the data copied in this step is not guaranteed be (and most likely is not) consistent. In FIG. 3, for purposes of simplicity, a step is shown as step 201 of "designat[ing] all blocks" and then step 206 directs to "copy all designated blocks". This presentation was adopted in the flowchart of FIG. 3 to reduce the representation of the process as a single loop. Those skilled in the art will readily recognize equivalent control structures and flow arrangements for FIG. 3.

As soon as copying step 206 begins (or before step 206 begins), another process 208 on the system controlling target volume 200 will record data identifying those data blocks on target volume 200 that have changed since the beginning of the previous set of copy operations, which in this case was copying step 206. In a preferred embodiment, this information is recorded in the form of a bitmap 204 stored in a control area of target volume 200, in which each block on target volume 200 is represented by a bit. The bitmap is created in a manner similar to that employed for journaling metadata on disk writes, but in this embodiment need only record the fact that a block has changed, in this case by changing the corresponding bit in the bitmap to "1". Other tracking data structures and mechanisms will be readily apparent to those skilled in the art.

FIG. 3 shows steps 206 and 208 running in parallel. They need not commence at the same time, so long as bitmap 204 (or whatever tracking mechanism is used) is suitably initialized or reinitialized when or as of the time step 206 begins.

When copy step 206 has been completed, if, per decision step 209 (see FIG. 3) any blocks have been flagged as changed in bitmap 204, represented in FIG. 2 as blocks 211, 212, and 213 (see decision block 301 in FIG. 3), these blocks are considered "designated blocks" (per step 214 in FIG. 3). The designated blocks are copied to destination volume 250 (in steps 271, 272 and 273, referred to collectively, together with similar additional steps, as "synchronization copying process" 270, replacing (in this implementation by overwriting) any corresponding earlier version of each such block that existed on destination volume 250. (Synchronization step 270 can be viewed as simply a reiteration of bulk copying step 206 with (usually) fewer designated blocks to copy, and accordingly is represented by the same block as step 206 in FIG. 3.)

The possibility exists that while executing synchronization process 270, additional changes to target volume 200 may occur, as it remains in full production throughout all these steps. In particular, some of the blocks that were synchronized in synchronization process 270 might have changed again before they were written to the destination image, in which case, the synchronization would have to be repeated. Accordingly, in this implementation, bitmap 204 is reinitialized upon beginning the synchronization process 270 and used to track any additional changes to target volume 200. If at the end of synchronization process 270 bitmap 204 reflects any new changes, the steps of synchronization, reinitializing bitmap 204 and tracking changes are repeated, until bitmap 204 reflects no as yet unsynchronized changes to target volume 200. (It can be seen in FIG. 3 that if there are no "changed blocks" at step 209, i.e., in this implementation bitmap 205 reflected no unsynchronized changes, then the process will terminate.)

It is also a possibility that in an extreme case of heavy load where target system 200 is sufficiently busy, process described above may not end within a desirable timeframe. If that process has continued for a length of time in excess of a predetermined limit, then a further step may be taken to slow down processing on target volume 200 by such amount and for so long as to allow the creation of the consistent image to be completed. A placeholder step, 321, has been inserted in FIG. 3 to represent where such throttling could be introduced. The step of slowing down is implemented in different ways in different operating systems through the use of operating system calls (APIs) well known to those of ordinary skill in the art. In one embodiment, under the Linux version 2.6 kernel, a "slow-down" step can be implemented with the "set_queue_congested" API, which has the effect of simulating a higher load than actually exists, causing the operating system scheduler to slow down the processing of I/O queues. Similarly, in the Windows operating system (e.g. Windows Server 2003 or 2008), the "IOCTL_VOLSNAP_FLUSH_AND_HOLD_WRITES" API may be used to stop other I/O processes completely (other APIs known to those skilled in the art may be used in Windows to slow down, as opposed to stop, disk I/O). The foregoing are only examples; the all of the methods described herein, including that of slowing down or stopping mass storage I/O when and if desired, are available and, with knowledge of the present disclosure, may be implemented in any modern operating system.

Alternatively, I/O to Target Volume 200 may be suspended if previous slowing down measures have not been effective, although that expedient is not preferred and should rarely if ever be necessary.

Figure 4:
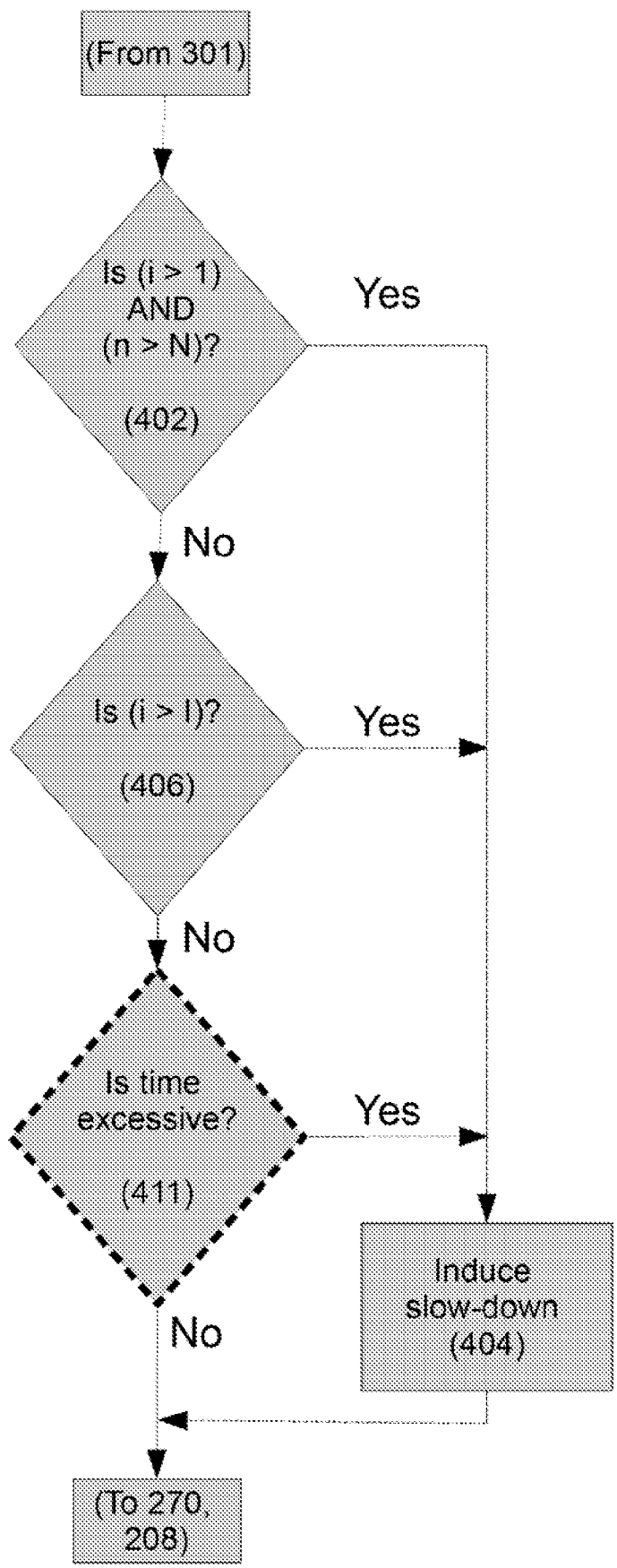
FIG. 4 is a flow chart showing additional steps in a preferred embodiment, which are performed to converge and stabilize a backup image which is being made under heavy processing load.

A flow chart further illustrating various "slow-down" measures that may be performed for step 321 is shown in FIG. 4. In this embodiment, the "slow down" step is done selectively, depending on observed conditions. It is not unusual in production operation for at least one synchronization step to be necessary, because the initial copying step 206 is generally lengthy, and if the system is in active production, there will almost certainly be changed blocks. However, a need to perform a second synchronization, after a first synchronization that would normally be quite small in extent compared to the initial copying, may be indicative of heavy I/O in progress during the backup. Thus, in step 402, if the number, i, of synchronization iterations is greater than 1, and if the number, n, of changed blocks at the end of any iteration, for which i>1, exceeds a total of N changed blocks, then "slow-down" step 404 is applied to the next iteration. Furthermore, as reflected in step 406 in FIG. 4, if the number of iterations, i, exceeds some pre-set maximum number, I, than a slow-down step 404 would be applied to the next iteration (and all subsequent iterations, because i can only increase) regardless of the number, n, of changed blocks in the prior synchronization iteration. In practice, the selection of the changed block threshold, N, would be environment-dependent, and would be a tunable number, preferably in the range of 10 to 1000, and most preferably approximately 100, though other selections may prove more efficient in a given environment. Similarly, the selection of the maximum iteration threshold, I, which in a preferred embodiment would be about 3, would also be environment-dependent. These steps, with suitably chosen values for N and I, are designed to bring about a controlled convergence and stabilization of a consistent image within a limited time frame, in a system that remains in active production use, with low impact on continued processing during the backup process. In the preferred embodiment, steps 402 ((i>1)&& (n>N)) and 406 (i>I) are both applied, but it should be understood that the method can also be practiced with only one of these steps. Alternatively, in addition to, or in lieu of those steps, step 411 may be performed, which is simply a test of whether elapsed time exceeds a certain threshold.

The present invention provides significant advantages over conventional data protection approaches involving the use of snap-shots. First, the process of creating a consistent image is no longer dependent on the ability to take a snapshot, which as explained above is uncertain in a high-volume environment. Second, the present invention involves steps that can either be scheduled and load-balanced (such as the copying of data blocks) or involve very little overhead (such as tracking changed blocks), or both. In any event, in the principal embodiments contemplated by the invention, it should not be necessary to interrupt production processing as required to make a snap-shot, and there is nothing in the principal steps required to implement such embodiments that cannot be done in the face of high production volumes and loads. It is believed that the present invention provides a much more robust approach than the prior art to the problem of creating consistent images of storage volumes.

Thus, it is apparent that the present invention meets the objects stated herein, in that it provides a method for creating a consistent backup of a storage volume while such volume remains in production use, without requiring the use of a snapshot, thereby avoiding the drawbacks that accompany snapshots.

Although the present invention has been described in detail, it should be understood that various changes, substitutions, and alterations may be readily ascertainable by those skilled in the art and may be made herein without departing from the spirit and scope of the present invention as defined by the following claims:

I claim:

1. A method for creating a consistent image of a target volume under control of an operating system running on a machine, said target volume comprising a plurality of data blocks, wherein said target volume remains available for read and write operations during the period that such consistent image is being created, said method comprising:
   (a) copying all of the data in the target volume to a destination volume (without regard to changes in the data while it was being copied);
   (b) maintaining a record identifying those data blocks on the target volume that have changed since the beginning of the most recent prior step (a) or step (c);
   (c) copying to the destination volume those data blocks identified by said record as having changed on the target volume since the beginning of the most recent prior step (a) or step (c), in such manner as to replace any prior representation of those blocks on the destination volume;

(d) determining whether said consistent image is sufficiently stabilizing, in accordance with predetermined criteria, in light of processing loads experienced during the image creation process, wherein said predetermined criteria comprise whether there remain changed blocks in the record created by step (b) after a predetermined time period of processing;

(e) if said consistent image is determined not to be sufficiently stabilizing, issuing a command to said operating system to slow down the processing of I/O queues on said machine, wherein the effect of said command is to simulate a high I/O load on said machine, in order to induce said operating system to slow down the processing of I/O queues on said machine; and (f) repeating steps (b) and (c) until said record shows no changed blocks on the target volume.

2. A method for creating a consistent image of a target volume under control of an operating system running on a machine, said target volume comprising a plurality of data blocks, wherein said target volume remains available for read and write operations during the period that such consistent image is being created, said method comprising:

(a) copying all of the data in the target volume to a destination volume (without regard to changes in the data while it was being copied);

(b) maintaining a record identifying those data blocks on the target volume that have changed since the beginning of the most recent prior step (a) or step (c);

(c) copying to the destination volume those data blocks identified by said record as having changed on the target volume since the beginning of the most recent prior step (a) or step (c), in such manner as to replace any prior representation of those blocks on the destination volume;

(d) determining whether said consistent image is sufficiently stabilizing, in accordance with predetermined criteria, in light of processing loads experienced during the image creation process, wherein said predetermined criteria comprise whether the number of iterations performed of steps (b) and (c) is greater than one, and the number of changed blocks recorded in the most recent iteration of said step (b) is in excess of a first predetermined number, N, of changed blocks;

(e) if said consistent image is determined not to be sufficiently stabilizing, issuing a command to said operating system to slow down the processing of I/O queues on said machine; and (f) repeating steps (b) and (c) until said record shows no changed blocks on the target volume.

3. The method of claim 2, wherein N is in the range of 10 to 1000.

4. The method of claim 2, wherein N is approximately 100.

5. A method for creating a consistent image of a target volume under control of an operating system running on a machine, said target volume comprising a plurality of data blocks, wherein said target volume remains available for read and write operations during the period that such consistent image is being created, said method comprising:

(a) copying all of the data in the target volume to a destination volume (without regard to changes in the data while it was being copied);

(b) maintaining a record identifying those data blocks on the target volume that have changed since the beginning of the most recent prior step (a) or step (c);

(c) copying to the destination volume those data blocks identified by said record as having changed on the target volume since the beginning of the most recent prior step (a) or step (c), in such manner as to replace any prior representation of those blocks on the destination volume;

(d) determining whether said consistent image is sufficiently stabilizing, in accordance with predetermined criteria, in light of processing loads experienced during the image creation process, wherein said predetermined criteria comprise whether the number of iterations performed of steps (b) and (c) is in excess of a predetermined number, I, of iterations;

(e) if said consistent image is determined not to be sufficiently stabilizing, issuing a command to said operating system to slow down the processing of I/O queues on said machine; and (f) repeating steps (b) and (c) until said record shows no changed blocks on the target volume.

6. The method of claim 5, wherein I is approximately 3.

* * * * *